(12) United States Patent
Neuvelt

(10) Patent No.: US 8,065,996 B1
(45) Date of Patent: Nov. 29, 2011

(54) TAILGATE GRILL SYSTEM

(76) Inventor: Dan Neuvelt, Tampa, FL (US)

( * ) Notice: Subject to any disclaimer, the term of this patent is extended or adjusted under 35 U.S.C. 154(b) by 515 days.

(21) Appl. No.: 12/218,551

(22) Filed: Jul. 16, 2008

(51) Int. Cl.
*A47J 37/00* (2006.01)

(52) U.S. Cl. .......... 126/25 R; 126/24; 126/30; 126/41 R; 126/276; 280/204; 280/569; 280/769; 224/282; 224/319; 224/321; 224/519; 248/352; 248/640

(58) Field of Classification Search .............. 126/25 R, 126/276, 41 R, 30, 24; 248/640, 352; 224/519, 224/282, 319, 321; 280/769, 506, 204; 414/462
See application file for complete search history.

(56) References Cited

U.S. PATENT DOCUMENTS

| | | | | |
|---|---|---|---|---|
| 4,094,296 A | * | 6/1978 | Beagley | 126/30 |
| 5,029,935 A | * | 7/1991 | Dufrancatel | 296/156 |
| 5,527,146 A | * | 6/1996 | Allsop et al. | 414/462 |
| 5,577,414 A | | 11/1996 | Ogawa et al. | |
| 5,626,126 A | * | 5/1997 | McNulty | 126/276 |
| 5,678,979 A | * | 10/1997 | Kovacs | 414/700 |
| 5,685,686 A | * | 11/1997 | Burns | 414/462 |
| 6,354,286 B1 | | 3/2002 | Davis | |
| 6,588,418 B1 | | 7/2003 | Loving | |
| 6,701,913 B1 | | 3/2004 | LeDuc et al. | |
| 6,877,505 B1 | * | 4/2005 | Den Hoed | 126/276 |
| 7,156,087 B1 | * | 1/2007 | Churchill et al. | 126/25 R |
| 2002/0050502 A1 | * | 5/2002 | Jeong | 224/506 |
| 2004/0040553 A1 | * | 3/2004 | McKoski | 126/276 |
| 2006/0086353 A1 | * | 4/2006 | Ransford | 126/37 B |
| 2008/0029683 A1 | * | 2/2008 | Draghici | 248/640 |

* cited by examiner

*Primary Examiner* — Steven B McAllister
*Assistant Examiner* — Avinash Savani

(57) ABSTRACT

A leg is adapted to be inserted into a standard removable hitch receiver. The leg has spaced vertical plates. Forward and rearward horizontally spaced lower pivot apertures are provided. A plurality of positioning apertures are provided in an arcuate pattern. A pivoting grill platform has associated plates. Forward and rearward horizontally spaced upper pivot apertures are provided. A coupling assembly includes a pivoting support arm and a pivoting leveling arm. Each arm has an upper aperture and bolt coupling upper pivot apertures of the grill. Each arm has a lower aperture and bolt coupling the pivot apertures of the vertical plates of the leg. A removable self locking pin is positionable through the locking aperture and a preselected one of the plurality of positioning apertures.

1 Claim, 2 Drawing Sheets

TAILGATE GRILL SYSTEM

BACKGROUND OF THE INVENTION

1. Field of the Invention

The present invention relates to a tailgate grill system and more particularly pertains to providing removable grilling capabilities to the rear of a vehicle, the system having a self leveling feature and a self stopping feature, all in a safe, convenient and economical manner.

2. Description of the Prior Art

The use of grilling systems of known designs and configurations is known in the prior art. More specifically, grilling systems of known designs and configurations previously devised and utilized for the purpose of providing portable grilling capabilities through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,701,913 issued Mar. 9, 2004 to LeDuc relates to a Swingable Apparatus attachable to a Vehicle for Transporting a Cooking Device and Permitting Access to the Vehicle. U.S. Pat. No. 6,588,418 issued Jul. 8, 2003 to Loving relates to a Transportable Extendable/Retractable Barbeque Grill. U.S. Pat. No. 6,354,286 issued Mar. 12, 2002 to Davis relates to a Barbeque Mounting Assembly for Vehicles. Lastly, U.S. Pat. No. 5,577,414 issued Nov. 26, 1996 to Ogawa relates to an Articulated Robot.

While these devices fulfill their respective, particular objectives and requirements, the aforementioned patents do not describe a tailgate grill system that allows for providing removable grilling capabilities to the rear of a vehicle, the system having a self leveling feature and a self stopping feature, all in a safe, convenient and economical manner.

In this respect, the tailgate grill system according to the present invention substantially departs from the conventional concepts and designs of the prior art, and in doing so provides an apparatus primarily developed for the purpose of providing removable grilling capabilities to the rear of a vehicle, the system having a self leveling feature and a self stopping feature, all in a safe, convenient and economical manner.

Therefore, it can be appreciated that there exists a continuing need for a new and improved tailgate grill system which can be used for providing removable grilling capabilities to the rear of a vehicle, the system having a self leveling feature and a self stopping feature, all in a safe, convenient and economical manner. In this regard, the present invention substantially fulfills this need.

SUMMARY OF THE INVENTION

In view of the foregoing disadvantages inherent in the known types of grilling systems of known designs and configurations now present in the prior art, the present invention provides an improved tailgate grill system. As such, the general purpose of the present invention, which will be described subsequently in greater detail, is to provide a new and improved tailgate grill system and method which has all the advantages of the prior art and none of the disadvantages.

To attain this, the present invention essentially comprises a tailgate grill system. First provided is a grill. The grill is in a generally rectilinear configuration. The grill has a planar lower support surface. The grill also has a rearwardly extending surface. The grill has a handle. In this manner the grill may be opened and closed. Further in this manner the grill may be moved between an upper orientation for transportation and storage and a lowered orientation for grilling operation and use.

A leg is provided. The leg is in a square cross sectional configuration. The leg has a forward end. A standard removable hitch receiver is provided. The preferred hitch receiver is a Reese style hitch receiver. The forward end of the leg is adapted to be inserted into the standard removable hitch receiver. The leg is adapted to allow the system to remain operational with the opening of a tailgate of a vehicle with which the system is utilized. The forward end of the leg has a horizontal aperture. The aperture is adapted to align with an aperture in an associated hitch receiver and receive a pin, not shown. In this manner th leg and hitch receiver may be coupled. The leg has a rearward end. The rearward end has spaced vertical plates. The vertical plates have forward and rearward horizontally spaced lower pivot apertures. The vertical plates also have a plurality of positioning apertures. The positioning apertures are in an arcuate pattern. A center of curvature is located at the forward lower pivot aperture.

Provided next is a pivoting grill platform. The platform has a planar lower surface. The platform has a planar upper surface. Bolts are provided. The bolts secure the lower surface of the grill to the upper surface of the platform. The platform also has associated L-shaped plates. The L-shaped plates have spaced vertical sections. The L-shaped plates have outwardly extending horizontal sections. The vertical sections have forward and rearward horizontally spaced upper pivot apertures.

Further provided is a coupling assembly. The coupling assembly includes a pivoting support arm. The coupling assembly includes a pivoting leveling arm. Each arm has an upper aperture and bolt. In this manner the upper pivot apertures of the grill are coupled. Each arm has a lower aperture and bolt. In this manner the pivot apertures of the vertical plates of the leg are coupled. The pivoting support arm is wider than the self leveling arm. A locking aperture is provided in the support arm at a location to align with a preselected one of the plurality of positioning apertures as a function of a desired height of the grill. The spacing of the support arm and the leveling arm are adapted to determine a location at which point the grill will stop when extended. The leg, platform and arms of the coupling assembly are fabricated of aluminum.

Provided last is a removable self locking pin. The self locking pin is positionable through the locking aperture and a preselected one of the plurality of positioning apertures as a function of a desired height of the grill.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tailgate grill system which has all of the advantages of the prior art grilling systems of known designs and configurations and none of the disadvantages.

It is another object of the present invention to provide a new and improved tailgate grill system which may be easily and efficiently manufactured and marketed.

It is further object of the present invention to provide a new and improved tailgate grill system which is of durable and reliable constructions.

An even further object of the present invention is to provide a new and improved tailgate grill system which is susceptible of a low cost of manufacture with regard to both materials and labor, and which accordingly is then susceptible of low prices of sale to the consuming public, thereby making such tailgate grill system economically available to the buying public.

Even still another object of the present invention is to provide a tailgate grill system for providing removable grilling capabilities to the rear of a vehicle, the system having a self leveling feature and a self stopping feature, all in a safe, convenient and economical manner.

Lastly, it is an object of the present invention to provide a new and improved tailgate grill system. A leg is adapted to be inserted into a standard removable hitch receiver. The leg has spaced vertical plates. Forward and rearward horizontally spaced lower pivot apertures are provided. A plurality of positioning apertures are provided in an arcuate pattern. A pivoting grill platform has associated plates. Forward and rearward horizontally spaced upper pivot apertures are provided. A coupling assembly includes a pivoting support arm and a pivoting leveling arm. Each arm has an upper aperture and bolt coupling upper pivot apertures of the grill. Each arm has a lower aperture and bolt coupling the pivot apertures of the vertical plates of the leg. A removable self locking pin is positionable through the locking aperture and a preselected one of the plurality of positioning apertures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
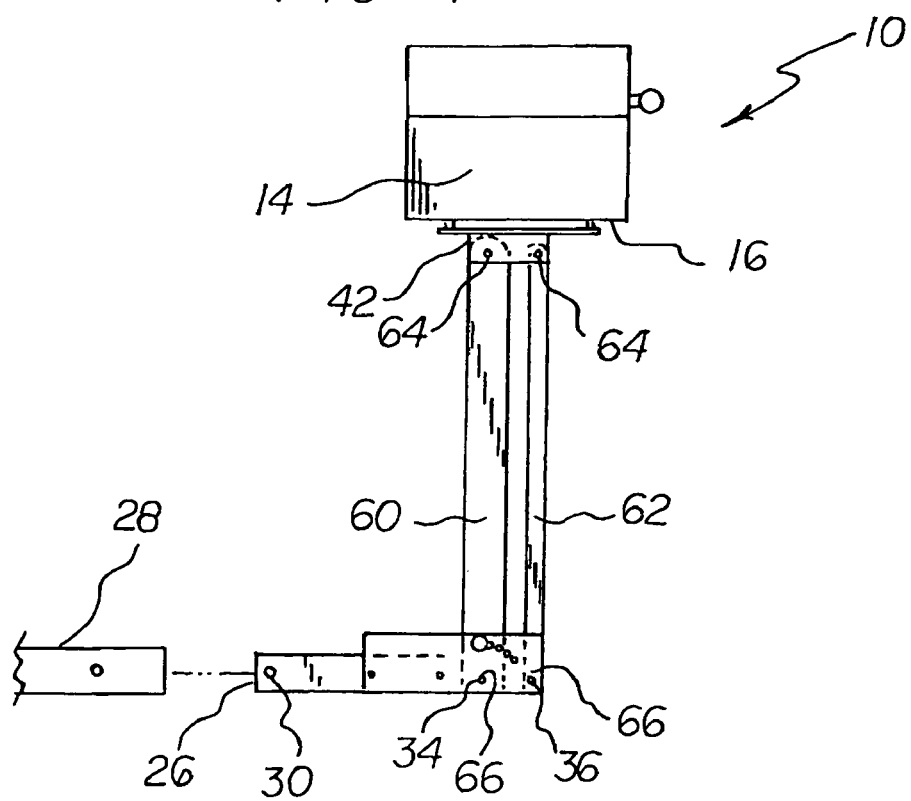
FIG. 1 is a side elevational view of a tailgate grill system constructed in accordance with the principles of the present invention.
Figure 2:
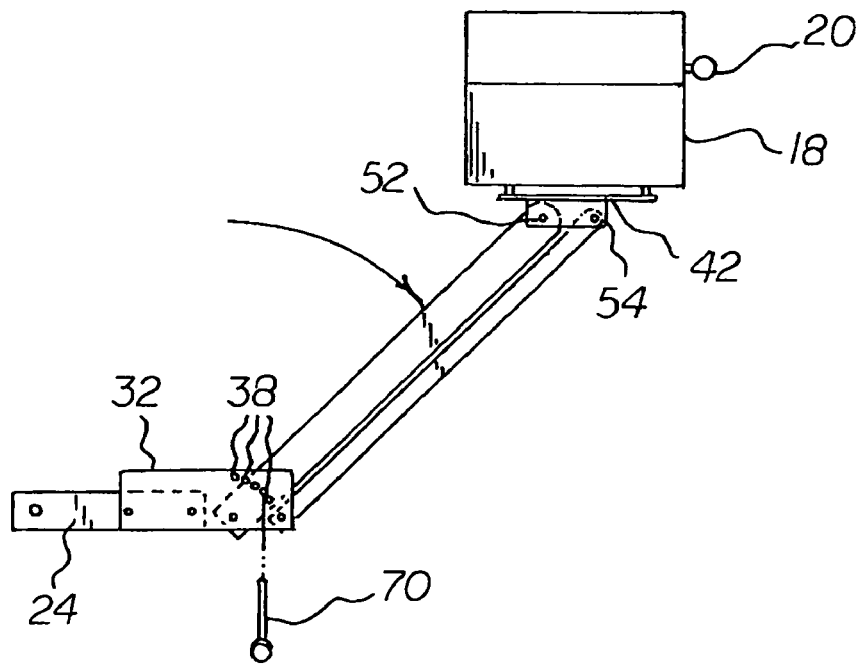
FIG. 2 is a side elevational view of the tailgate grill system shown in FIG. 1 but with the grill in a lowered operative orientation.
Figure 3:
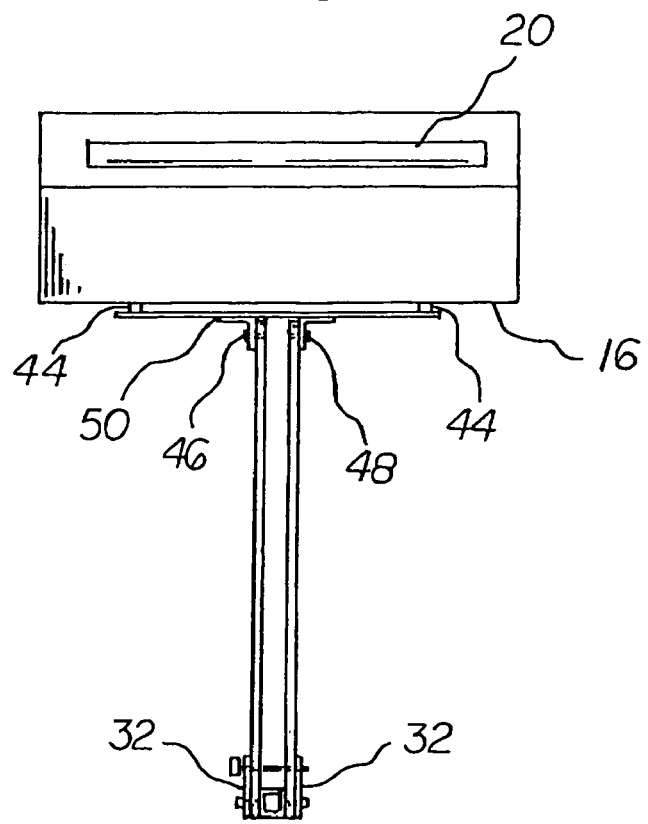
FIG. 3 is a front elevational view of the tailgate grill system shown in FIGS. 1 and 2.

With reference now to the drawings, and in particular to FIG. 1 thereof, the preferred embodiment of the new and improved tailgate grill system embodying the principles and concepts of the present invention and generally designated by the reference numeral 10 will be described.

The present invention, the tailgate grill system 10 is comprised of a plurality of components. Such components in their broadest context include a leg, a pivoting grill platform, a coupling assembly and a removable self locking pin. Such components are individually configured and correlated with respect to each other so as to attain the desired objective.

First provided is a grill 14. The grill is in a generally rectilinear configuration. The grill has a planar lower support surface 16. The grill also has a rearwardly extending surface 18. The grill has a handle 20. In this manner the grill may be opened and closed. Further in this manner the grill may be moved between an upper orientation for transportation and storage and a lowered orientation for grilling operation and use.

A leg 24 is provided. The leg is in a square cross sectional configuration. The leg has a forward end 26. A standard removable hitch receiver 28 is provided. The preferred hitch receiver is a Reese style hitch receiver. The forward end of the leg is adapted to be inserted into the standard removable hitch receiver. The leg is adapted to allow the system to remain operational with the opening of a tailgate of a vehicle with which the system is utilized. The forward end of the leg has a horizontal aperture 30. The aperture is adapted to align with an aperture in an associated hitch receiver and receive a pin, not shown. In this manner th leg and hitch receiver may be coupled. The leg has a rearward end. The rearward end has spaced vertical plates 32. The vertical plates have forward and rearward horizontally spaced lower pivot apertures 34, 36. The vertical plates also have a plurality of positioning apertures 38. The positioning apertures are in an arcuate pattern. A center of curvature is located at the forward lower pivot aperture.

Provided next is a pivoting grill platform 42. The platform has a planar lower surface. The platform has a planar upper surface. Bolts 44 are provided. The bolts secure the lower surface of the grill to the upper surface of the platform. The platform also has associated L-shaped plates 46. The L-shaped plates have spaced vertical sections 48. The L-shaped plates have outwardly extending horizontal sections 50. The vertical sections have forward and rearward horizontally spaced upper pivot apertures 52, 54.

Further provided is a coupling assembly 58. The coupling assembly includes a pivoting support arm 60. The coupling assembly includes a pivoting leveling arm 62. Each arm has an upper aperture and bolt 64. In this manner the upper pivot apertures of the grill are coupled. Each arm has a lower aperture and bolt 66. In this manner the pivot apertures of the vertical plates of the leg are coupled. The pivoting support arm is wider than the self leveling arm. A locking aperture is provided in the support arm at a location to align with a preselected one of the plurality of positioning apertures as a function of a desired height of the grill. The spacing of the support arm and the leveling arm are adapted to determine a location at which point the grill will stop when extended. The leg, platform and arms of the coupling assembly are fabricated of aluminum.

Provided last is a removable self locking pin 70. The self locking pin is positionable through the locking aperture and a preselected one of the plurality of positioning apertures as a function of a desired height of the grill.

Figure 4:
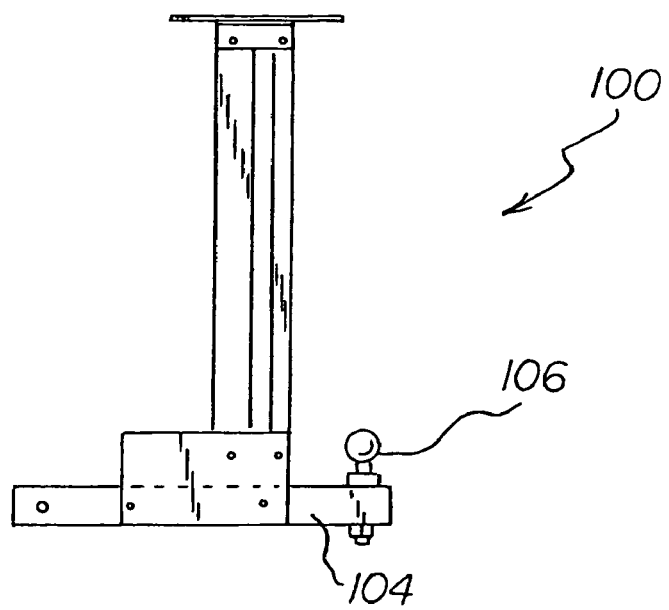
FIG. 4 is a side elevational view similar to FIG. 1 illustrating an alternate embodiment of the invention but with the grill and hitch receiver removed.

Reference is now made to FIG. 4 which illustrates an alternate embodiment 100 of the invention. The leg has a square cross sectional configuration. An extension 104 is provided. The extension extends rearwardly beyond the coupling assembly. An upwardly extending ball 106 is provided. The upwardly extending ball receives and supports a trailing vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tailgate grill system for providing removable grilling capabilities to the rear of a vehicle, the system having a self leveling feature and a self stopping feature, all in a safe, convenient and economical manner comprising, in combination:

a grill in a generally rectilinear configuration and including a planar lower support surface, the grill also including a rearwardly extending surface with a handle for opening and closing the grill and for moving the grill between an upper orientation for transportation and storage and a lowered orientation for grilling operation and use;

a leg having a square cross sectional configuration with a forward end adapted to be inserted into a standard removable hitch receiver, the leg being adapted to allow the system to remain operational with the opening of a tailgate of a vehicle with which the system is utilized, the forward end of the leg including a horizontal aperture adapted to align with an aperture in an associated hitch receiver and receive a pin for coupling purposes, the leg having a rearward end with spaced vertical plates, the vertical plates being formed with forward and rearward horizontally spaced lower pivot apertures and a plurality of positioning apertures, the positioning apertures being in an arcuate pattern with a center of curvature located at the forward lower pivot aperture;

a pivoting grill platform having a planar lower surface and a planar upper surface with bolts securing the lower surface of the grill to the upper surface of the platform, the platform also having associated L-shaped plates with spaced vertical sections and outwardly extending horizontal sections, the vertical sections being formed with forward and rearward horizontally spaced upper pivot apertures;

a coupling assembly including a pivoting support arm and a pivoting leveling arm, each arm having an upper aperture and bolt coupling upper pivot apertures of the grill, each arm having a lower aperture and bolt coupling the pivot apertures of the vertical plates of the leg, the pivoting support arm being wider than the pivoting leveling arm with a locking aperture formed in the support arm at a location to align with a preselected one of the plurality of positioning apertures as a function of a desired height of the grill, the spacing of the support arm and the leveling arm being adapted to determine a location at which point the grill will stop when extended, the leg, platform and arms of the coupling assembly being fabricated of aluminum; and a removable self locking pin positionable through the locking aperture and a preselected one of the plurality of positioning apertures as a function of a desired height of the grill whereby the pivoting grill platform and grill are movable between an upper horizontal orientation and a lower horizontal orientation and a plurality of intermediate horizontal orientations.

* * * * *